United States Patent
Nakatani et al.

(10) Patent No.: US 7,969,853 B2
(45) Date of Patent: Jun. 28, 2011

(54) OPTICAL PICKUP DEVICE

(75) Inventors: Morio Nakatani, Ichinomiya (JP); Kenji Nagatomi, Kaizu (JP); Yoshiyuki Matsumura, Anpachi-Gun (JP); Seiichiro Takahashi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 33 days.

(21) Appl. No.: 12/541,626

(22) Filed: Aug. 14, 2009

(65) Prior Publication Data

US 2009/0303857 A1 Dec. 10, 2009

Related U.S. Application Data

(63) Continuation of application No. PCT/JP2008/051794, filed on Feb. 4, 2008.

(30) Foreign Application Priority Data

Feb. 16, 2007 (JP) .................................. 2007-036927

(51) Int. Cl.
*G11B 7/00* (2006.01)

(52) U.S. Cl. .................................................. 369/112.24

(58) Field of Classification Search ............. 369/112.23, 369/112.24
See application file for complete search history.

(56) References Cited

U.S. PATENT DOCUMENTS

| | | | | |
|---|---|---|---|---|
| 6,574,174 | B1 * | 6/2003 | Amble et al. | 369/44.26 |
| 6,625,099 | B2 * | 9/2003 | Nakano | 369/94 |
| 6,756,574 | B2 * | 6/2004 | Higuchi | 250/201.2 |
| 7,593,304 | B2 * | 9/2009 | Matsumoto et al. | 369/103 |
| 7,652,967 | B2 * | 1/2010 | Sugaya et al. | 369/94 |
| 7,821,901 | B2 * | 10/2010 | Matsui | 369/112.04 |
| 2001/0005344 | A1 | 6/2001 | Nakano | |
| 2007/0146836 | A1 * | 6/2007 | Fukushima et al. | 359/3 |

FOREIGN PATENT DOCUMENTS

| | | | |
|---|---|---|---|
| JP | 5-225582 | * | 3/1993 |
| JP | 2001-176117 A | | 6/2001 |
| JP | 2002-312958 A | | 10/2002 |
| JP | 2004-335060 A | | 11/2004 |
| JP | 2006-107662 A | | 4/2006 |
| JP | 2007-200427 A | | 8/2007 |
| JP | 2008-21348 A | | 1/2008 |

OTHER PUBLICATIONS

Machine translation of JP 5-225582.*
International Search report dated May 13, 2008 for corresponding application No. PCT/JP2008/051794.
International Preliminary Report on Patentability for PCT/JP2008/051794, dated Aug. 27, 2009, pp. 1-10.

* cited by examiner

*Primary Examiner* — Aristotelis Psitos
(74) *Attorney, Agent, or Firm* — Ditthavong Mori & Steiner, P.C.

(57) ABSTRACT

A servo objective lens and a recording/reproducing objective lens are commonly held on a holder. The servo objective lens and the recording/reproducing objective lens are integrally displaced, thereby pulling servo light onto a servo layer. Upon the pulling, focus positions of recording light and reproducing light follow a focus position of the servo light. As a result, the focus positions of recording light and reproducing light are set close to the servo layer. Thereafter, an optical element for displacing the focus positions of recording light and reproducing light in the optical axis direction is driven to pull the recording light and the reproducing light onto a targeted recording layer.

2 Claims, 7 Drawing Sheets

OPTICAL PICKUP DEVICE

This application claims priority under 35 U.S.C. Section 119 of Japanese Patent Application No. 2007-036927 filed Feb. 16, 2007, entitled "OPTICAL PICKUP DEVICE". The disclosures of the above applications are incorporated herein by reference.

This application is a continuation of PCT/JP2008/051794, filed on Feb. 4, 2008, which was published under PCT Article 21(2).

BACKGROUND OF THE INVENTION

1. Field of the Invention

The present invention relates to an optical pickup device, and more particularly to an optical pickup device compatible with a multilayer recording medium having a plurality of recording layers for recording information by multi-photon absorption in a laminated direction.

2. Description of the Related Art

In recent years, as the capacity of a recording medium is increased, there has been developed an optical recording medium having a plurality of recording layers in a laminated direction. For instance, the optical recording medium may have an arrangement that the plurality of recording layers and one servo layer are laminated. In this recording medium, a flat recording layer without a guide track is formed, and a servo layer having a guide track is formed on the recording layer. In this arrangement, in performing a recording/reproducing operation, a focusing servo signal and a tracking servo signal are generated based on the guide track formed in the servo layer. Controlling the position of a beam spot on the recording layer based on the servo signals allows the beam spot to scan the recording layer along an intended scanning trajectory.

In an optical pickup device compatible with the recording medium, it is necessary to provide an arrangement for individually and respectively setting servo laser light and recording/reproducing laser light to a servo layer and a recording layer. In this arrangement, since the recording/reproducing laser light is pulled onto the recording layer based on a relation with the servo layer, and subjected to servo control, it is preferable to drive a recording/reproducing objective lens and a servo objective lens with a predetermined cooperative relation to each other, rather than simply driving the objective lenses independently of each other, to cause the recording/reproducing laser light to easily follow a scanning trajectory on a targeted recording layer.

In the case where a plurality of sets of layers each constituted of one servo layer and a plurality of recording layers are arranged in a laminated direction, control may be performed in such a manner that, after servo laser light is pulled onto a targeted recording layer and a servo layer constituting a set of layers with the targeted recording layer, recording/reproducing laser light is pulled onto the targeted recording layer. In this arrangement, by causing the focus position of recording/reproducing laser light to follow the focus position of servo laser light in pulling the servo laser light onto the servo layer, the focus position of recording/reproducing laser light can be set close to the servo layer. This makes it easy to pull the recording/reproducing laser light onto the targeted recording layer, after the servo laser light is pulled onto the servo layer.

SUMMARY OF THE INVENTION

An object of the present invention is to provide an optical pickup device compatible with a multilayer recording medium having a plurality of sets of layers each constituted of one servo layer and a plurality of recording layers in a laminated direction, which is capable of smoothly and speedily pulling recording/reproducing laser light to a targeted recording layer, and smoothly performing servo control with respect to the targeted recording layer.

An optical pickup device for a recording medium according to a primary aspect of the present invention includes: a first light source for emitting laser light having a first wavelength; a second light source for emitting laser light having a second wavelength; a third light source for emitting laser light having a third wavelength; a recording/reproducing objective lens for converging the laser light having the first wavelength and the laser light having the second wavelength on the recording medium; a servo objective lens for converging the laser light having the third wavelength on the recording medium; a recording/reproducing optical system for guiding the laser light having the first wavelength and the laser light having the second wavelength to the recording/reproducing objective lens, and guiding at least reflection light for reproducing, out of reflection light of the laser light having the first wavelength and the laser light having the second wavelength from the recording medium, to a reproducing photodetector; a servo optical system for guiding the laser light having the third wavelength to the servo objective lens, and guiding reflection light of the laser light having the third wavelength from the recording medium to a servo photodetector; a holder for integrally holding the recording/reproducing objective lens and the servo objective lens; and an objective lens actuator for driving the holder. The recording/reproducing optical system includes an optical element for displacing a focus position of the laser light having the first wavelength and a focus position of the laser light having the second wavelength in an optical axis direction of the laser light having the first wavelength and the laser light having the second wavelength.

BRIEF DESCRIPTION OF THE DRAWINGS

Above and other objects, and novel features of the present invention will become more apparent upon reading the following detailed description of the embodiment along with the accompanying drawings.

The drawings are provided mainly for describing the present invention, and do not limit the scope of the present invention.

DESCRIPTION OF THE PREFERRED EMBODIMENTS

Figure 1:
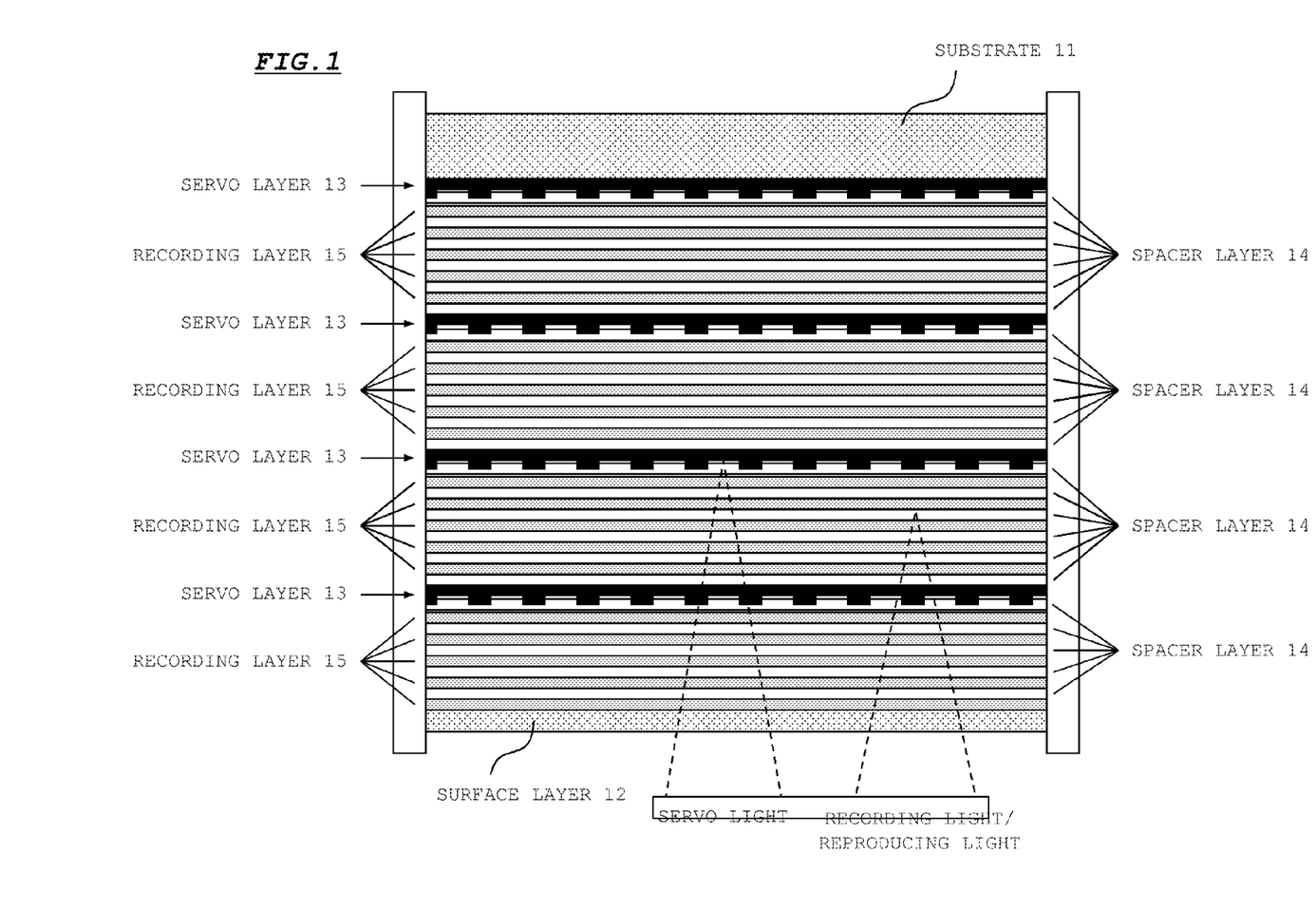
FIG. 1 is a diagram showing a sectional structure of an optical disc in accordance with an embodiment of the present invention.

FIG. 1 shows a sectional structure of an optical disc 10 in accordance with the embodiment.

As shown in FIG. 1, the optical disc 10 is constructed in such a manner that four sets of layers are formed between a substrate 11 and a surface layer 12, wherein each set of layers is constituted of a servo layer 13, six spacer layers 14, and five recording layers 15.

The substrate 11 and the surface layer 12 are each made of a light transmissive material such as polycarbonate, polyolefin, or acrylic resin. A biodegradable material or the like may be used as a material of the substrate 11 and the surface layer 12.

The servo layer 13 is made of a material having a high reflectance with respect to servo laser light (hereinafter, referred to as "servo light"), and low reflectances with respect to recording laser light (hereinafter, referred to as "recording light") and reproducing laser light ("hereinafter, referred to as "reproducing light"). In the embodiment, red laser light of about 635 nm wavelength is used as servo light, infrared laser light of 800 nm wavelength is used as recording light, and blue laser light of about 450 nm wavelength is used as reproducing light. In view of this, for instance, niobium pentoxide is used as a material of the servo layer 13.

Figure 2:
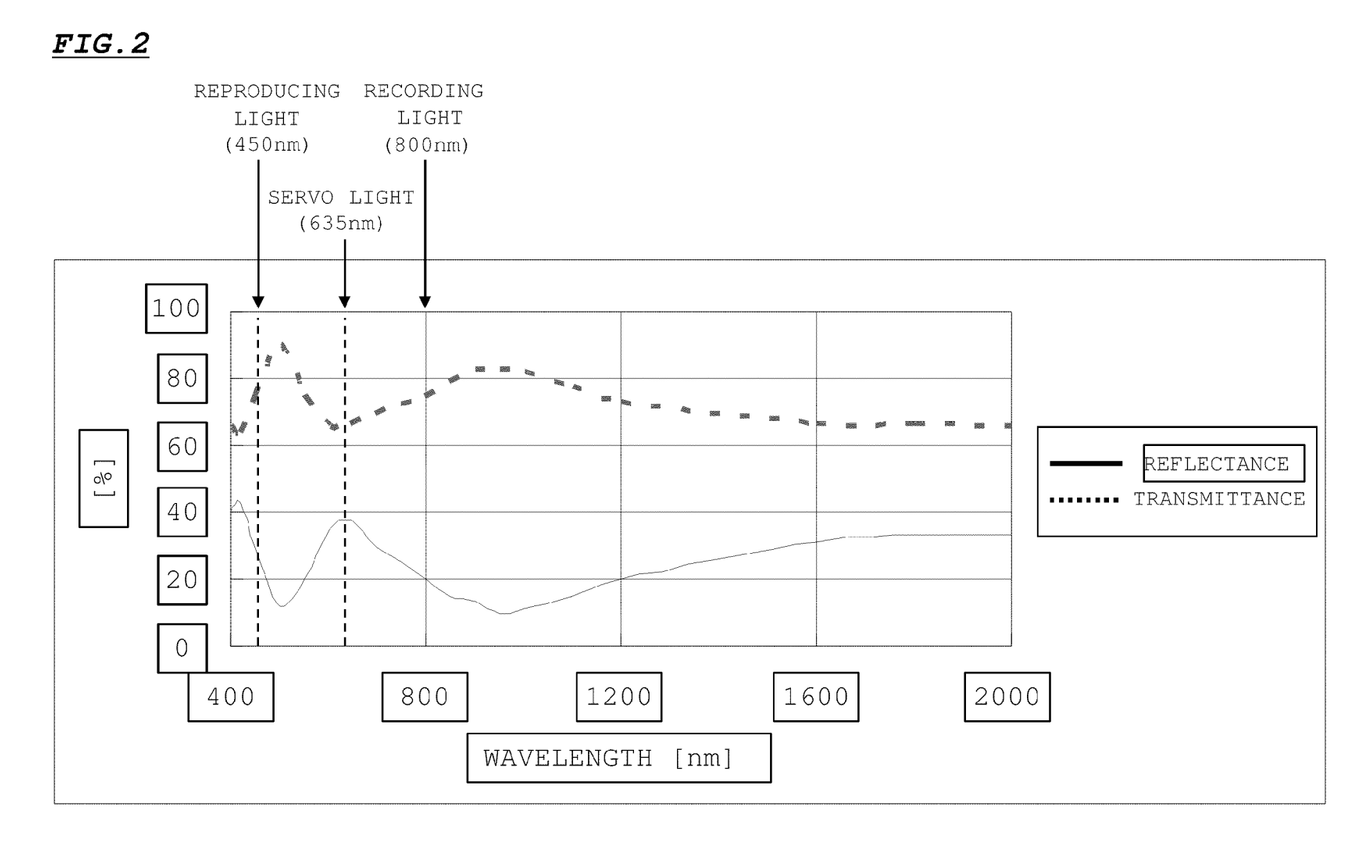
FIG. 2 is a diagram showing an optical characteristic of a servo layer material in accordance with the embodiment of the present invention.

FIG. 2 is a diagram showing an optical characteristic of a film made of niobium pentoxide. As shown in FIG. 2, the film has a high reflectance with respect to light near 635 nm wavelength, and extremely low reflectances with respect to light near 500 nm wavelength and 800 nm wavelength. Accordingly, in the case where the wavelength of servo light is set to 635 nm, and the wavelengths of recording light and reproducing light are respectively set to 450 nm and 800 nm, as described above, the film has a high reflectance with respect to servo light, and low reflectances with respect to recording light and reproducing light.

In this example, niobium pentoxide is used as a material of the servo layer 13. This is because, the wavelengths of servo light, recording light, and reproducing light are respectively set to 635 nm, 800 nm, and 450 nm, as described above. In the case where the wavelengths of servo light, recording light, and reproducing light are set to values other than the above, a material having a high reflectance with respect to servo light, and low reflectances with respect to recording light and reproducing light is selected as a material of the servo layer 13.

Referring back to FIG. 1, the spacer layer 14 is made of a UV curable resin, or a transparent film member coated with an adhesive agent on both surfaces thereof.

The recording layer 15 is made of a material having a property that the refractive index of the recording layer 15 is changed by two-photon absorption. The two-photon absorption is a phenomenon that a material is excited by absorbing two photons. The probability of occurrence of two-photon absorption is proportional to the square of an incident light intensity (non-linear optical effect). In other words, two-photon absorption is induced solely in an area where the energy of incident light is concentrated. Condensing incident light through a lens enables to generate a condition that two-photon absorption occurs solely on a focal point including its vicinity, whereas two-photon absorption does not occur in the other space where light is not focused. Specifically, two-photon absorption can be induced in a two-photon absorbing material by condensing and irradiating laser light having an absorption wavelength bandwidth of the two-photon absorbing material with an ultra-short pulse and a high intensity. There is also proposed a method for inducing two-photon absorption in a two-photon absorbing material by condensing and irradiating laser light having an absorption wavelength bandwidth of the two-photon absorbing material, while irradiating light of a wavelength other than the absorption wavelength bandwidth. In the latter method, the energy level of the two-photon absorbing material is raised by the light of the wavelength other than the absorption wavelength bandwidth. Accordingly, two-photon absorption is induced, even if the intensity level of laser light having the absorption wavelength bandwidth is suppressed to some extent.

In this embodiment, recording light and reproducing light are simultaneously irradiated on the recording layer 15 in performing a recording operation. Two-photon absorption is induced by irradiating recording light on the recording layer 15, while irradiating reproducing light on the recording layer 15, thereby raising the energy level of the recording layer 15. In view of this, a two-photon absorbing material having the above optical function is used as a material of the recording layer 15.

An exemplified material of the recording layer 15 is a diarylethene derivative or a spiropyran derivative. In this embodiment, since the wavelengths of recording light and reproducing light are respectively set to 800 nm and 450 nm, cis-1,2-dicyano-1,2-bis(2,4,5-trimethyl-3-thienyl) can be used as an exemplified material of the diarylethene derivative, and 1,3,3-trimethylindolino-6-nitrobenzopyrylospiran can be used as an exemplified material of the spiropyran derivative. In the case where wavelengths other than 800 nm and 450 nm are selected as the wavelengths of recording light and reproducing light, the material of the recording layer is changed depending on the selected wavelengths. Other examples of the recording layer 15 are a photopolymer, a photorefractive crystal, a fluorescent pigment, and a fluorescent material containing ZnS or ZnO.

A spiral groove is formed in the servo layer 13, and thus a spiral land is formed on an area between the groove areas. The structures of the groove and the land will be described later referring to FIG. 5A. The recording layers 15 are each made of a uniform and flat film having a predetermined thickness. The spacer layers 14 are respectively formed between the servo layer 13 and the recording layer 15, between the surface layer 12 and the recording layer 15, and between the respective two recording layers 15 adjacent to each other in the laminated direction.

Figure 3:
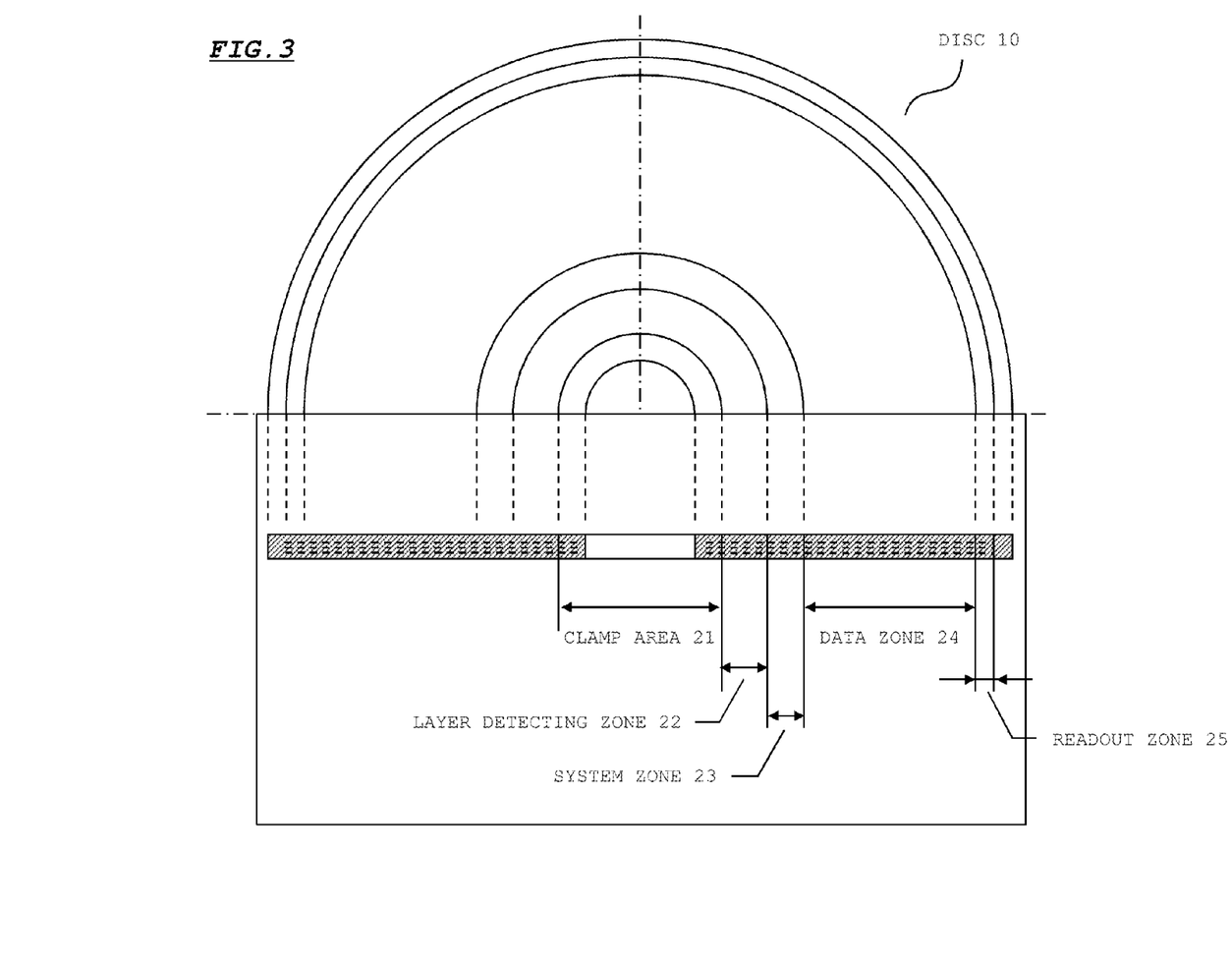
FIG. 3 is a diagram showing an area format of the optical disc in accordance with the embodiment of the present invention.

FIG. 3 is a diagram showing an area format of the optical disc 10. As shown in FIG. 3, an area of the optical disc 10 is divided into a clamp area 21, a layer detecting zone 22, a system zone 23, a data zone, 24, and a readout zone 25 radially from the inner circumference to the outer circumference of the disc 10. The aforementioned groove structure is formed from the layer detecting zone 22 to the readout zone 25.

The clamp area 21 is an area for chucking the optical disc 10 on a turntable in an optical disc apparatus. The layer detecting zone 22 is a zone for detecting order of a servo layer 13 counted from the surface layer 12. The servo layer 13 at the layer detecting zone has a layer structure for identifying the servo layer. For instance, a servo layer ID for identifying each servo layer is recorded by intermittently erasing the servo layer 13 in the circumferential direction of the disc.

The system zone 23 holds information for controlling a recording/reproducing operation. User information is recorded in the data zone 24. In the embodiment, the user information is recorded in the recording layers 15 at the data zone 24 by following a scanning trajectory corresponding to a groove, as well as a scanning trajectory corresponding to a land. Information indicating that a detected area corresponds to an outer peripheral portion of the disc is recorded in the readout zone 25.

Figure 4A:
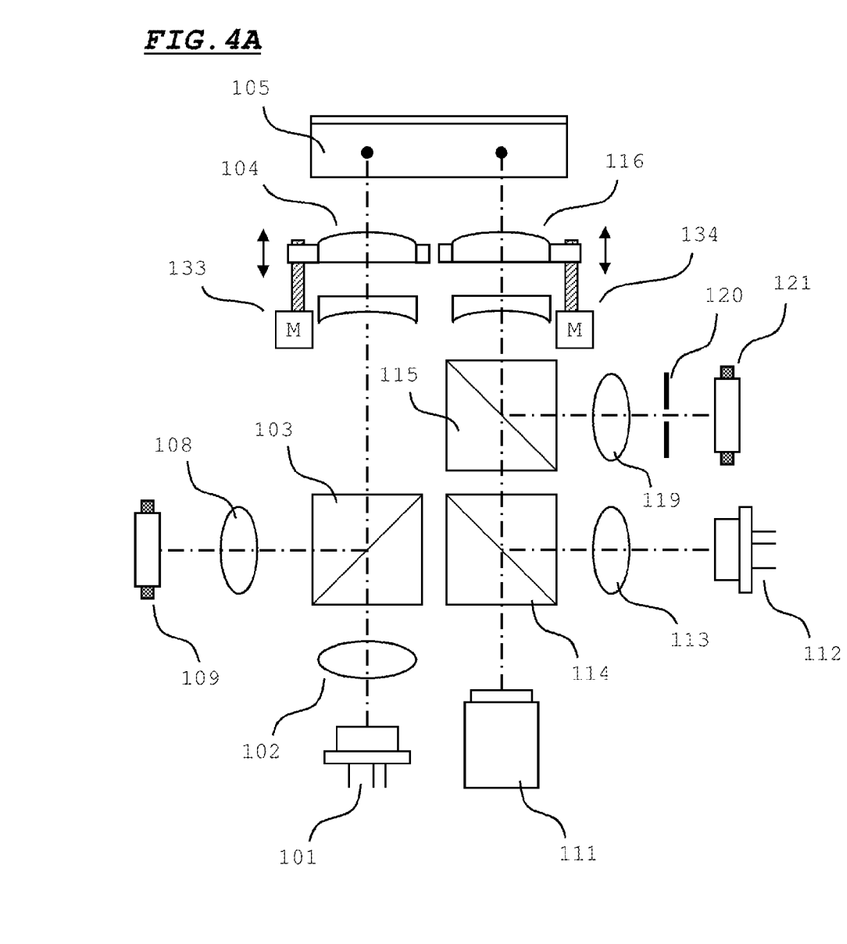
FIGS. 4A and 4B are diagrams showing an arrangement (optical system) of an optical pickup device in accordance with the embodiment of the present invention.
Figure 4B:
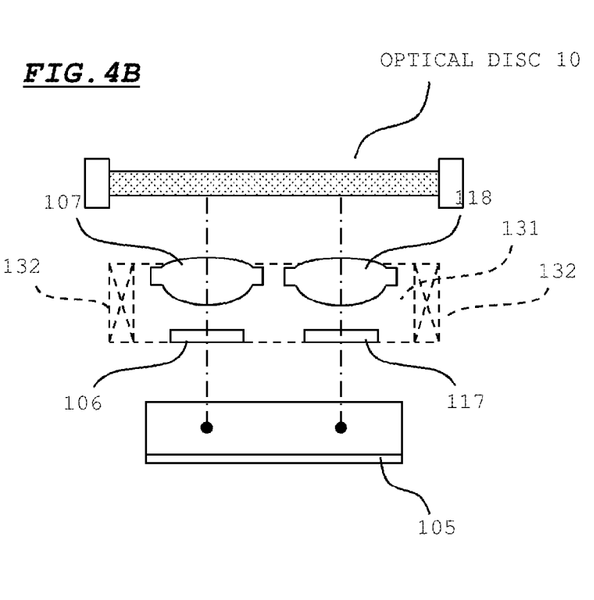

FIGS. 4A and 4B are diagrams showing an arrangement (optical system) of the optical pickup device. FIG. 4A is a plan view of the optical system, wherein quarter wavelength plates 106 and 117, a servo objective lens 107, and a recording/reproducing objective lens 118 are not illustrated. FIG. 4B is a side view of the optical system, wherein a rise-up mirror 105, the quarter wavelength plates 106 and 117, the servo objective lens 107, and the recording/reproducing objective lens 118 are illustrated.

Referring to FIGS. 4A and 4B, the reference numerals 101 through 109 indicate elements constituting an optical system for irradiating servo light on the optical disc 10, and the reference numerals 111 through 121 indicate elements constituting an optical system for irradiating recording light and reproducing light on the optical disc 10.

The semiconductor laser 101 emits servo light of 635 nm wavelength. A collimator lens 102 collimates servo light emitted from the semiconductor laser 101 into parallel light. A polarized beam splitter 103 transmits substantially the whole of servo light to be incident from the collimator lens 102, and reflects substantially the whole of servo light to be incident from the beam expander 104. The beam expander 104 is constituted of a combination of a concave lens and a convex lens. One of the concave lens and the convex lens is driven in the optical axis direction by an actuator 133. In this example, the actuator 133 includes a motor and a worm gear, and is driven in accordance with a servo signal for use in correcting aberration of servo light on a servo layer 13.

The rise-up mirror 105 reflects servo light to be incident from the beam expander 104 in the direction of the servo objective lens 107. The rise-up mirror 105 also reflects recording light and reproducing light to be incident from the beam expander 116 in the direction of the recording/reproducing objective lens 118.

The quarter wavelength plate 106 converts servo light to be incident from the rise-up mirror 105 into circularly polarized light, and converts servo light (reflection light from the optical disc 10) to be incident from the servo objective lens 107 into linearly polarized light orthogonal to a polarization direction toward the servo objective lens 107. The servo objective lens 107 converges servo light on the servo layer 13.

An anomorphic lens 108 introduces astigmatism to servo light (reflection light from the optical disc 10) reflected on the polarized beam splitter 103. A photodetector 109 receives servo light converged on the anomorphic lens 108, and outputs a detection signal. The photodetector 109 has a four-division sensor for receiving servo light. The photodetector 109 is arranged at such a position that the optical axis of servo light passes a point of intersection of sensor dividing lines of the four-division sensor.

A femto-second laser 111 emits recording light of 800 nm wavelength. The recording light is emitted from the femto-second laser 111 as parallel light. A semiconductor laser 112 emits reproducing light of 450 nm wavelength. A collimator lens 113 collimates reproducing light emitted from the semiconductor laser 112 into parallel light. A dichroic prism 114 combines recording light emitted from the femto-second laser 111 and reproducing light emitted from the semiconductor laser 112.

A polarized beam splitter 115 transmits substantially the whole of recording light and reproducing light to be incident from the dichroic prism 114, and reflects substantially the whole of reproducing light out of the recording light and the reproducing light to be incident from the beam expander 116. Specifically, a wavelength-selective light polarization film capable of acting solely on reproducing light is formed on the polarized beam splitter 115.

The beam expander 116 is constituted of a combination of a concave lens and a convex lens, and one of the concave lens and the convex lens is driven in the optical axis direction by an actuator 134. In this example, the actuator 134 includes a motor and a worm gear, and is driven in accordance with a servo signal for pulling recording light and reproducing light onto a recording layer 15 (hereinafter, the recording layer is specifically called as a "targeted recording layer 15") to be recorded or reproduced.

Recording light and reproducing light transmitted through the beam expander 116 are reflected toward the recording/reproducing objective lens 118 by the rise-up mirror 105. The quarter wavelength plate 117 converts recording light and reproducing light to be incident from the rise-up mirror 105 into circularly polarized light, and converts recording light and reproducing light (reflection light from the optical disc 10) to be incident from the recording/reproducing objective lens 118 into linearly polarized light orthogonal to the polarization direction toward the recording/reproducing objective lens 118.

The recording/reproducing objective lens 118 converges recording light and reproducing light on a targeted recording layer 15. A wavelength-selective hologram for converging recording light and reproducing light at an identical position on the optical disc 10 is formed on a surface of the recording/reproducing objective lens 118. In other words, focal lengths of recording light and reproducing light having different wavelengths from each other are adjusted by the hologram.

The condenser lens 119 converges reproducing light (reflection light from the optical disc 10) reflected on the polarized beam splitter 115. A pinhole plate 120 has a very small pinhole, and the pinhole is formed at such a position that the pinhole coincides with a focus position of reproducing light reflected on the targeted recording layer 15. In this arrangement, a primary part of reproducing light reflected on the targeted recording layer 15 is transmitted through the pinhole, and a primary part of reproducing light (stray light) reflected on the recording layers 15 other than the targeted recording layer 15 is blocked by the pinhole plate 120, without transmitting through the pinhole.

An APD (Avalanche Photo Diode) 121 receives reproducing light transmitted through the pinhole plate 120, and outputs a reproducing signal. The APD 121 is a photodetector capable of detecting a minute change in light amount.

The quarter wavelength plates 106 and 117, the servo objective lens 107, and the recording/reproducing objective lens 118 are mounted on a holder 131 in common. In this example, the holder 131 is driven in a focusing direction, a tracking direction, and a tilt direction by an objective lens actuator 132. The objective lens actuator 132 is constituted of a well-known coil and magnetic circuit, and the coil is mounted on the holder 131. In response to supply of a servo signal to the objective lens actuator 132, the quarter wavelength plates 106 and 117, the servo objective lens 107, and the recording/reproducing objective lens 118 are displaced in the focusing direction, the tracking direction, and the tilt direction integrally with the holder 131.

Figure 5A:
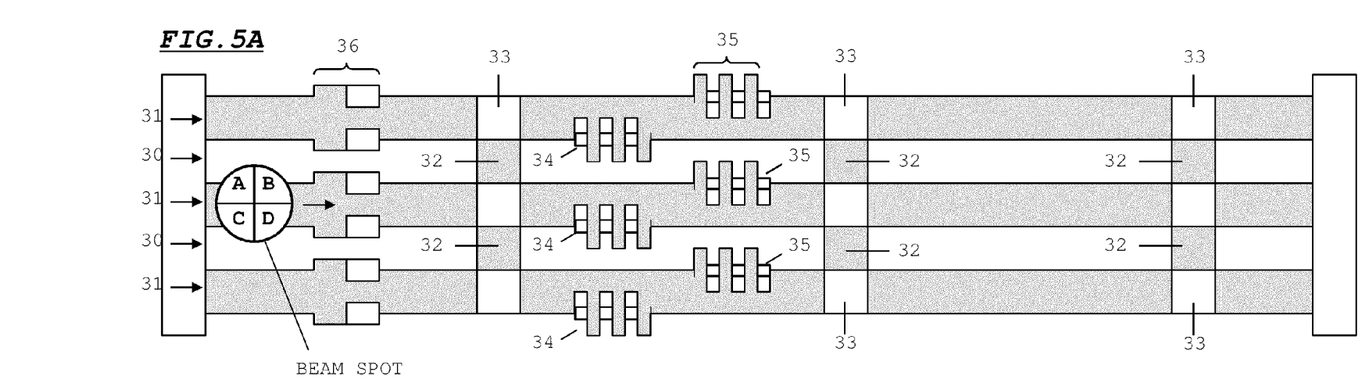
FIGS. 5A, 5B, and 5C are diagrams for describing a method for generating various servo signals in accordance with the embodiment of the present invention.

FIG. 5A is a diagram showing a groove structure of the servo layer 13.

Referring to FIG. 5A, the reference numeral 30 indicates a land, 31 indicates a groove, and 32 and 33 indicate FCMs (Fine Clock Marks) formed on the land 30 and the groove 31 at a predetermined interval. A depth of the FCM 32 is the same as the depth of the groove 31, and a height of the FCM 33 is the same as the height of the land 30.

The reference numerals 34 and 35 indicate address structures for holding physical addresses of the land 30 and the groove 31. The address structures 34 and 35 are formed by wobbling a wall surface at each of boundaries between an area of the land 30 and an area of the groove 31 in the disc radial direction. In this example, the two address structures 34 and 35 sequentially formed along the groove 31 hold the same physical address. Accordingly, different physical addresses are held in the address structures 34 and 35 formed sequentially along the land 30.

In this arrangement, the physical address on the land 30 is defined by the address structure 35 on the land 30, and the address structure 34 on the land 30 is used to acquire the physical address held in the address structure 35, in the case where the address structure 35 is not read. In other words, in this arrangement, the physical address on the land 30 is acquired by adding/subtracting an address difference between the address structures 34 and 35 on the land 30 to/from the physical address acquired by reading the address structure 34.

The reference numeral 36 indicates a tilt mark for detecting a tilt state of a servo layer 13 at a beam spot scanning position. The tilt mark 36 is formed by increasing or decreasing the groove width in the disc radial direction by a predetermined size.

Figures 5B, 5C:
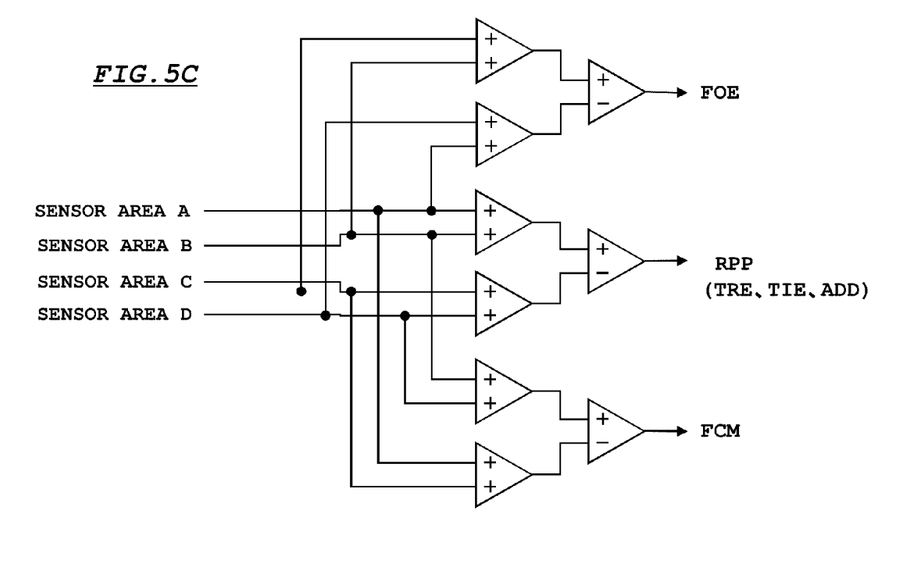

FIG. 5B is a diagram showing a four-division sensor arranged in the photodetector 109. FIG. 5C is a diagram showing a circuit arrangement (computing circuit) for generating a focusing error signal (FOE signal), a radial push-pull signal (RPP signal), and a fine clock mark signal (FCM signal) based on outputs from the four-division sensor.

As shown in FIG. 5C, the computing circuit includes six adder circuits and three subtractor circuits. Reflection light from four divided areas "A", "B", "C", and "D" of a beam spot shown in FIG. 5A is guided to sensor areas "A", "B", "C", and "D" of the four-division sensor shown in FIG. 5B, respectively. In this example, assuming that detection signals to be outputted from the sensor areas "A", "B", "C", and "D" are respectively "a", "b", "c", and "d", a focusing error signal (FOE signal) is generated by a signal computation: FOE=(b+c)−(a+d). A radial push-pull signal (RPP signal) is generated by a signal computation: RPP=(a+b)−(c+d), and a fine clock mark signal (FCM signal) is generated by a signal computation: FCM=(b+d)−(a+c).

If a beam spot is displaced in the radial direction from a center of the groove 31, a radial push-pull signal (RPP signal) has a polarity and a magnitude depending on a direction and an amount of the displacement. A tracking error signal (TRE signal) is generated by extracting the polarity and the magnitude.

If a beam spot passes a tilt mark portion 36 in a state that a servo layer 13 is tilted, an S-shaped curve appears on a radial push-pull signal (RPP signal) depending on a tilt state of the servo layer 13. A tilt error signal (TIE signal) is generated by comparing and computing an amplitude peak value of the S-shaped curve.

Further, when the beam spot passes the address structures 34 and 35, the radial push-pull signal (RPP signal) is modulated depending on the wobble shapes of the address structures 34 and 35. A physical address at the beam spot scanning position is acquired by extracting a modulated component with use of a frequency filter, and demodulating the extracted modulated component.

Figure 6:
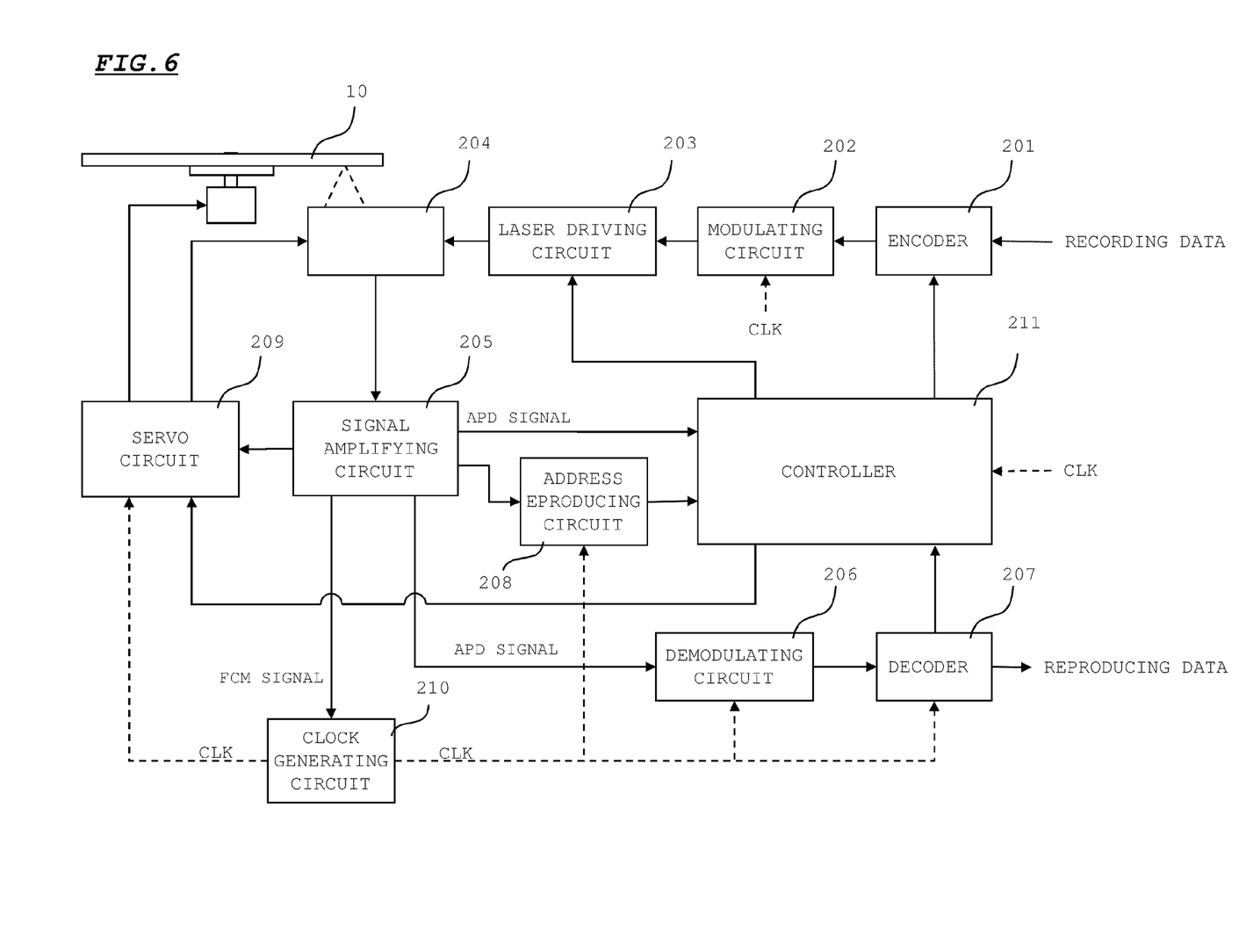
FIG. 6 is a diagram showing an arrangement of an optical disc apparatus in accordance with the embodiment of the present invention.

FIG. 6 is a diagram showing an arrangement of an optical disc apparatus for recording and reproducing information with respect to the optical disc 10.

As shown in FIG. 6, the optical disc apparatus includes an encoder 201, a modulating circuit 202, a laser driving circuit 203, an optical pickup device 204, a signal amplifying circuit 205, a demodulating circuit 206, a decoder 207, an address reproducing circuit 208, a servo circuit 209, a clock generating circuit 210, and a controller 211.

The encoder 201 encodes inputted recording data by, for example, adding an error correction code, and outputs the encoded data to the modulating circuit 202. The modulating circuit 202 modulates the inputted recording data as determined, generates a recording signal, and outputs the recording signal to the laser driving circuit 203.

In performing a recording operation, the laser driving circuit 203 supplies a drive signal in accordance with a recording signal from the modulating circuit 202 to the femto-second laser 111 in the optical pickup device 204, and supplies drive signals to the semiconductor lasers 101 and 112, respectively, in the optical pickup device 204 to cause the semiconductor lasers 101 and 112 to emit servo light and reproducing light with predetermined powers. In performing a reproducing operation, the laser driving circuit 203 supplies drive signals to the semiconductor lasers 101 and 112, respectively, in the optical pickup device 204 to cause the semiconductor lasers 101 and 112 to emit servo light and reproducing light with predetermined powers.

In this example, the laser power in performing a recording/reproducing operation is controlled based on a control signal from the controller 211. In performing a recording operation, the controller 211 performs a test-recording operation with respect to a test-write area, while changing the power of recording light, monitors an APD signal (detection signal from the APD 121) to be inputted from the signal amplifying circuit 205 in performing the test-recording operation, and sets a power of recording light which makes the level of the APD signal equal to or larger than a predetermined threshold value, as the power in performing the recording operation. In performing a reproducing operation, the controller 211 monitors an APD signal to be inputted from the signal amplifying circuit 205, while changing the power of reproducing light, and adjusts the power of reproducing light so that the level of the APD signal becomes equal to or larger than a predetermined threshold value.

The optical pickup device 204 has the optical system shown in FIGS. 4A and 4B. The signal amplifying circuit 205 includes the computing circuit shown in FIG. 5C, and a circuit arrangement for amplifying a detection signal from the APD 121 in the optical pickup device 204, and removing a noise from the detection signal. The demodulating circuit 206 demodulates an APD signal inputted from the signal amplifying circuit 205 to generate reproducing data, and outputs the reproducing data to the decoder 207. The decoder 207 decodes data inputted from the demodulating circuit 206 by, for example, error correction, and outputs the decoded data to a post-stage circuit.

The address reproducing circuit 208 extracts a frequency component, depending on the address structures 34 and 35, from a radial push-pull signal (RPP signal) inputted from the signal amplifying circuit 205, demodulates the extracted frequency component, and acquires a physical address. The acquired physical address is supplied to the controller 211. In the case where a physical address is not reproducible from one of the address structures 34 and 35, the address reproducing circuit 208 reproduces a physical address from the other one of the address structures 34 and 35.

The servo circuit 209 generates a focusing servo signal and a tracking servo signal based on a focusing error signal (FOE signal) and a tracking error signal (TRE signal) inputted from the signal amplifying circuit 205, and outputs the focusing servo signal and the tracking servo signal to the objective lens actuator 132 in the optical pickup device 204. The servo circuit 209 also generates a tilt servo signal based on an S-shaped curve on a radial push-pull signal (RPP signal) inputted from the signal amplifying circuit 205, and outputs the tilt servo signal to the objective lens actuator 132 in the optical pickup device 204. The servo circuit 209 also generates a motor servo signal based on a fine clock mark signal (FCM signal) inputted from the signal amplifying circuit 205, and outputs the motor servo signal to a disc driving motor. In addition to the above, the servo circuit 209 drives the actuators 133 and 134 in the optical pickup device 204 in performing a recording/reproducing operation, which will be described later.

The clock generating circuit 210 generates a recording clock signal and a reproducing clock signal based on a fine clock mark signal (FCM signal) inputted from the signal amplifying circuit 205, and supplies the recording clock signal and the reproducing clock signal to the respective circuits.

The controller 211 includes a CPU (Central Processing Unit), and an internal memory. Various data are stored in the internal memory, and the controller 211 controls the respective parts in accordance with a predetermined program.

Figure 7A:
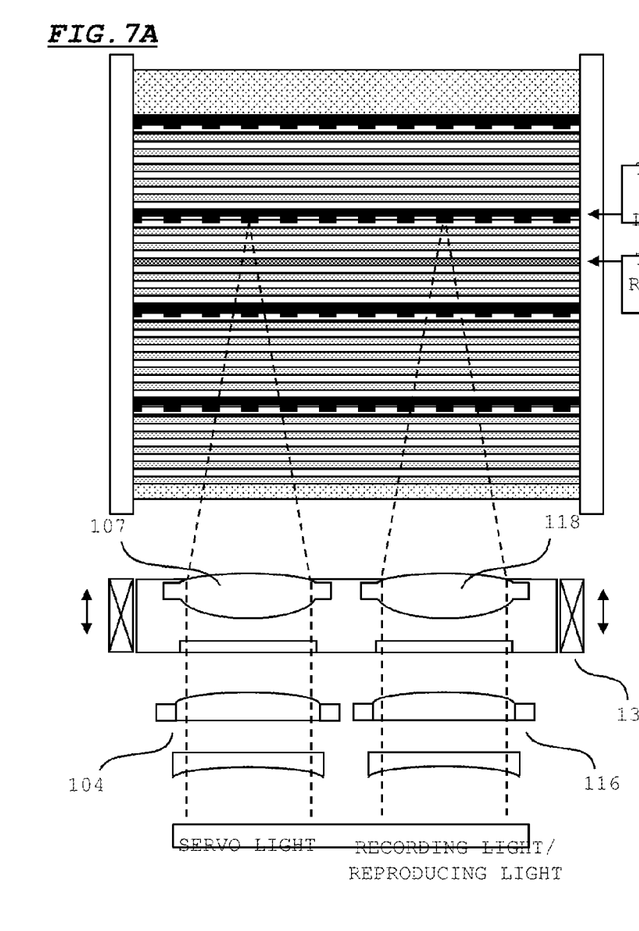
FIGS. 7A and 7B are conceptual diagrams showing recording and reproducing operations in accordance with the embodiment of the present invention.
Figure 7B:
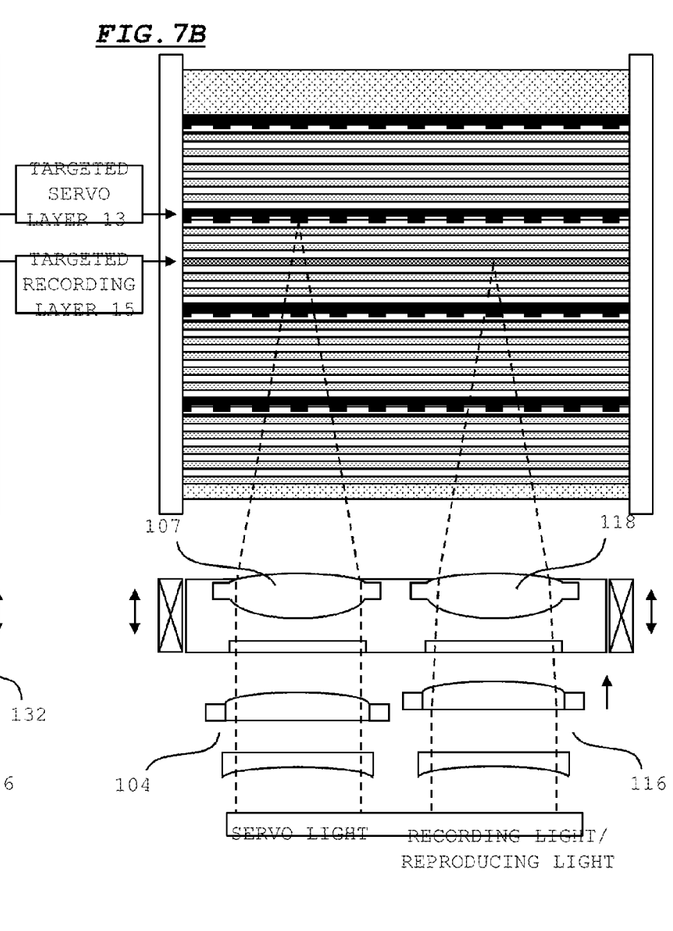

FIGS. 7A and 7B are conceptual diagrams showing control operations to be performed by the optical pickup device 204 in performing recording and reproducing operations.

In the case where recording light and reproducing light are irradiated on a targeted recording layer 15, first, the objective lens actuator 132 is driven and controlled with servo light being emitted. Then, as shown in FIG. 7A, the focus position of servo light is pulled onto a servo layer 13 (hereinafter, the servo layer is specifically called as a "targeted servo layer 13") constituting a set of layers with the targeted recording layer 15. In performing the pulling operation, the beam expander 116 is set to an initial state, and the focus positions of recording light and reproducing light are, for example, positioned on the targeted servo layer 13, as well as the servo light.

Thereafter, the beam expander 116 is driven by the number of steps required for shifting the focus positions of recording light and reproducing light to the targeted recording layer 15. Accordingly, the focus positions of recording light and reproducing light are shifted to the targeted recording layer 15. Then, the reproducing light is emitted in this state, and the beam expander 116 is minutely driven and controlled to optimize the APD signal. Accordingly, the reproducing light is focused on the targeted recording layer 15, whereby reproduction with respect to the targeted recording layer 15 is allowed.

In performing a recording operation, recording light is emitted in the above state. In performing the recording operation, the recording light is modulated (turned on/off) depending on a recording signal. Accordingly, the recording light and the reproducing light are simultaneously irradiated on a targeted recording layer 15, whereby recording with respect to the targeted recording layer 15 is performed.

As described above, in performing a recording/reproducing operation, a focusing servo signal, a tracking servo signal, and a tilt servo signal are applied to the objective lens actuator 132, and the servo objective lens 107 and the recording/reproducing objective lens 118 are integrally driven in the focusing direction, the tracking direction, and the tilt direction. Accordingly, beam spots of recording light and reproducing light scan the targeted recording layer 15 along a track corresponding to the groove or the land on the targeted servo layer 13.

In this embodiment, the recording/reproducing objective lens 118 and the servo objective lens 107 are integrally held on a holder 131, and the holder 131 is driven in a focusing direction, a tracking direction, and a tilt direction by the objective lens actuator 132. Accordingly, in performing servo control, the recording/reproducing objective lens 118 and the servo objective lens 107 are moved in cooperation to each other, therefore recording light and reproducing light smoothly follow a scanning trajectory on a targeted recording layer.

In this embodiment, since the recording/reproducing objective lens 118 and the servo objective lens 107 are integrally driven, the focus positions of recording light and reproducing light can follow the focus position of servo light in pulling the servo light onto the targeted servo layer 13. As a result, the focus positions of recording light and reproducing light can be set close to the targeted servo layer 13. Accordingly, recording light and reproducing light can be smoothly and speedily pulled onto the targeted recording layer 15 after the servo light is pulled onto the targeted servo layer 13. In this example, recording light and reproducing light are pulled onto a targeted recording layer 15 by driving the beam expander 116. This enables to simplify the arrangement of the optical pickup device without the need of providing, in the holder 131, an arrangement for displacing the recording/reproducing objective lens 118 relative to the servo objective lens 107 in the focusing direction.

The embodiment of the present invention is not limited to the above, but various modifications are applicable.

For instance, in the foregoing embodiment, five recording layers 15 are formed in combination with one servo layer 13 to constitute a set of layers. Alternatively, recording layers of the number other than five may be formed in combination with one servo layer 13. Further, in the foregoing embodiment, four sets of layers each constituted of a servo layer 13 and a predetermined number of recording layers 15 are formed in the laminated direction. Alternatively, the number of layer sets may be other than the above, and the present invention is applicable to a case that solely one set of layers is formed.

In the foregoing embodiment, the beam expander 116 is used to adjust the focus positions of recording light and reproducing light. Alternatively, a liquid crystal element or the like may be used, in place of the beam expander 116. For instance, a crystal element for position adjustment recited in, for example, Japanese Unexamined Patent Publication No. 2006-12247A may be used. The modification is advantageous in simplifying the arrangement because an actuator is not required, but has a disadvantage that the power of laser light may be attenuated while the laser light passes through the liquid crystal element.

In the foregoing embodiment, the focus positions of recording light and reproducing light are aligned to each other. Alternatively, the focus positions of recording light and reproducing light may not be aligned to each other, and the focus positions of recording light and reproducing light may be displaced in the optical axis direction to simultaneously irradiate a recording layer with the recording light and the reproducing light. In the modification, the beam expander 116 is stepwise driven in such a manner that recording light is pulled onto the targeted recording layer 15 in performing a recording operation, and reproducing light is pulled onto the targeted recording layer 15 in performing a reproducing operation.

In the foregoing embodiment, a recording operation is performed by simultaneously irradiating recording light and reproducing light on a recording layer 15. Alternatively, a recording operation may be performed by irradiating solely recording light on a recording layer 15. In the modification, the arrangement of the optical pickup device is substantially same as described above, except that control with respect to the femto-second laser 111 and the semiconductor laser 112 is different. Specifically, in performing a recording operation, only the femto-second laser 111 for emitting recording light emits light with an ultra-short pulse, and the semiconductor laser 112 for emitting reproducing light does not emit light. In this arrangement, since the energy level of a recording layer 15 cannot be raised by reproducing light, the emission power of the femto-second layer 111 is increased, as compared with the embodiment. In the case where a recording operation is performed solely with recording light, it is possible to use a two-photon absorbing material substantially the same as the two-photon absorbing material used in the embodiment as a material of the recording layers 15.

Further, the wavelengths of the respective laser light, the materials of the layers, the film thicknesses, and the like are not limited to the above. Furthermore, the arrangements of the optical disc apparatus may be changed or modified as necessary.

The embodiment of the present invention may be changed or modified in various ways as necessary, as far as such changes and modifications do not depart from the scope of the claims of the present invention hereinafter defined.

What is claimed is:

1. An optical pickup device for a recording medium, comprising:
   a first light source for emitting laser light having a first wavelength;
   a second light source for emitting laser light having a second wavelength;
   a third light source for emitting laser light having a third wavelength;
   a recording/reproducing objective lens for converging the laser light having the first wavelength and the laser light having the second wavelength on the recording medium;
   a servo objective lens for converging the laser light having the third wavelength on the recording medium;
   a recording/reproducing optical system for guiding the laser light having the first wavelength and the laser light having the second wavelength to the recording/reproducing objective lens, and guiding at least reflection light for reproducing, out of reflection light of the laser light having the first wavelength and the laser light having the second wavelength from the recording medium, to a reproducing photodetector;
   a servo optical system for guiding the laser light having the third wavelength to the servo objective lens, and guiding reflection light of the laser light having the third wavelength from the recording medium to a servo photodetector;
   a holder for integrally holding the recording/reproducing objective lens and the servo objective lens; and
   an objective lens actuator for driving the holder, wherein
      the recording/reproducing optical system includes an optical element for displacing a focus position of the laser light having the first wavelength and a focus position of the laser light having the second wavelength in an optical axis direction of the laser light having the first wavelength and the laser light having the second wavelength.

2. The optical pickup device according to claim 1, wherein the optical element is a beam expander for changing a focal length of the laser light having the first wavelength and a focal length of the laser light having the second wavelength, and
the optical pickup device further includes an actuator for driving the beam expander.

\* \* \* \* \*

UNITED STATES PATENT AND TRADEMARK OFFICE
CERTIFICATE OF CORRECTION

PATENT NO. : 7,969,853 B2
APPLICATION NO. : 12/541626
DATED : June 28, 2011
INVENTOR(S) : Morio Nakatani et al.

It is certified that error appears in the above-identified patent and that said Letters Patent is hereby corrected as shown below:

In the drawings, Sheet 1, Fig. 1, on the bottom, the rectangular box obscuring part of "SERVO LIGHT" and "RECORDING LIGHT" should be deleted.

In the drawings, Sheet 2, Fig. 2, all boxes surrounding the numbers along the bottom and vertically along the left side, the box surrounding "WAVELENGTH [nm]" on the bottom, the box surrounding "REFLECTANCE" on the right side, and the box surrounding the "%" sign should be deleted.

In the drawings, Sheet 3, Fig. 3, the solid horizontal line through the middle of the drawing should be a broken horizontal line similar to the broken vertical line on the top half of the drawing.

In the drawings, Sheet 4, Fig. 4B, the two boxes at the ends of optical disc 10, one near reference numeral 107, and the other partially obscuring the reference numeral 118, should be deleted.

In the drawings, Sheet 5, Fig. 5A, the rectangular boxes on either end of the drawing, the left one surrounding the arrows near reference numerals 30 and 31, and the right one, should be deleted. Further, all of the small horizontal lines within the grooves at reference numerals 34 and 35 in the middle of the drawing should be deleted.

In the drawings, Sheet 7, Figs. 7A and 7B, the four vertically elongated white boxes (one on each side of the top portions of Fig. 7A and 7B) should be deleted. Also, the two rectangular boxes in the middle of Figs. 7A and 7B, partially obscuring the recitations of "TARGETED SERVO LAYER 13" and "TARGET RECORDING LAYER 15", should be deleted. Also, the two horizontally elongated rectangular boxes on the bottom of Figs. 7A and 7B, partially obscuring "SERVO LIGHT and RECORDING LIGHT/REPRODUCING LIGHT" should be deleted.

Signed and Sealed this
Seventeenth Day of July, 2012

David J. Kappos
*Director of the United States Patent and Trademark Office*